INVENTOR
Roy C. Abbett
BY
Charles H. Brown
ATTORNEY

INVENTOR
Roy C. Abbett
BY
Charles H. Brown
ATTORNEY

March 13, 1956 R. C. ABBETT 2,738,464

VOLTAGE DIVIDER NETWORK

Filed July 9, 1951 6 Sheets-Sheet 3

INVENTOR
Roy C. Abbett
BY Charles H. Brown
ATTORNEY

INVENTOR
Roy C. Abbett
BY
Charles H. Brown
ATTORNEY

March 13, 1956 R. C. ABBETT 2,738,464

VOLTAGE DIVIDER NETWORK

Filed July 9, 1951 6 Sheets-Sheet 5

INVENTOR
Roy C. Abbett
BY
Charles H. Brown
ATTORNEY

March 13, 1956 R. C. ABBETT 2,738,464

VOLTAGE DIVIDER NETWORK

Filed July 9, 1951 6 Sheets-Sheet 6

INVENTOR
Roy C. Abbett
BY Charles H. Brown
ATTORNEY 2,738,464
Patented Mar. 13, 1956

2,738,464

VOLTAGE DIVIDER NETWORK

Roy Chester Abbett, Audubon, N. J., assignor to Radio Corporation of America, a corporation of Delaware Application July 9, 1951, Serial No. 235,817

8 Claims. (Cl. 333—8)

This invention relates to voltage divider networks, and more particularly to such networks suitable for the voltage division of radio frequency signals utilizing tightly coupled transformer elements of high efficiency.

The problem of dividing signals in the very high frequency band for distribution to a number of outlets with a minimum of loss has become a major one with the advent of master antenna and distribution systems for television and frequency modulation broadcasts. It is most desirable in such applications to divide the signal equally between a number of outlets without the voltage dividing network absorbing large amounts of power from the signal to be distributed. Resistance networks, which are satisfactory with a very high signal level, absorb too much power and require additional amplification for any but the very highest signal strengths, or else severely limit the number of possible outlets which may be served by such a distribution system.

A tightly coupled bifilar transformer or transmission coil has many advantages when used in a voltage division system of the foregoing type, and coupling arrangements employing such transformers as voltage dividers are known which give four outputs from a single input. A known arrangement of five of these distribution transformers has the input line connected to one of them, and the four output lines are connected to the input circuits of four other similar transformers. There are thus available sixteen outputs from a single input line. This tandem arrangement has the drawback of interposing considerable absorption loss between the main input line and the sixteen outputs.

The utility of these bifilar transformers or transmission coils is heightened by the characteristics of such transformers which enable the coupling of a balanced load to an unbalanced input and vice versa. The present invention employs these bifilar transformers in a novel connection to give a voltage dividing network suitable for the division of alternating current signals for a plurality of outputs with a minimum of insertion loss and with fewer transformers than prior systems for the same number of outputs.

It is therefore an object of this invention to provide an improved voltage divider network utilizing bifilar transformers giving a plurality of outputs from a single input.

Another object of the invention is to obtain a plurality of outputs in a signal distribution system utilizing bifilar transformers, with fewer components and with a minimum of loss between the main input line and the various output connections.

Briefly, in accordance with the present invention, there is provided a voltage divider network having a single pair of input terminals to which may be connected a source of voltage having a characteristic impedance of Z. A number of pairs of bifilar transformers with an impedance which is an integral multiple of the characteristic impedance of Z are connected in parallel or in a combination series-parallel relation across the input terminals. Impedance matching between the network and the input circuit is obtained by connecting a number of pairs of bifilar transformers in parallel or series parallel across the input terminals. The output side of the network enables the connection of load devices having an impedance of either Z, 2Z, or 4Z or combinations of these impedances.

In one embodiment of the invention, equal voltage division from a single input having an impedance of Z is obtained at sixteen separate outputs, each of which is terminated with a load or utilization device having an impedance of Z. With all of the separate outputs correctly terminated, reflection loss is substantially completely eliminated. The absorption loss is reduced over that of prior art systems and the number of possible outlets which may be served by the system as well as the level of signal supplied to each outlet is increased. Also, the present system eliminates a number of connecting elements and thus reduces losses due to mismatch at the connectors.

A more complete understanding of the operation and features of the invention, together with additional objects thereof, may be gained from a reading of the following description in connection with the accompanying drawings, in which.

Figure 1:
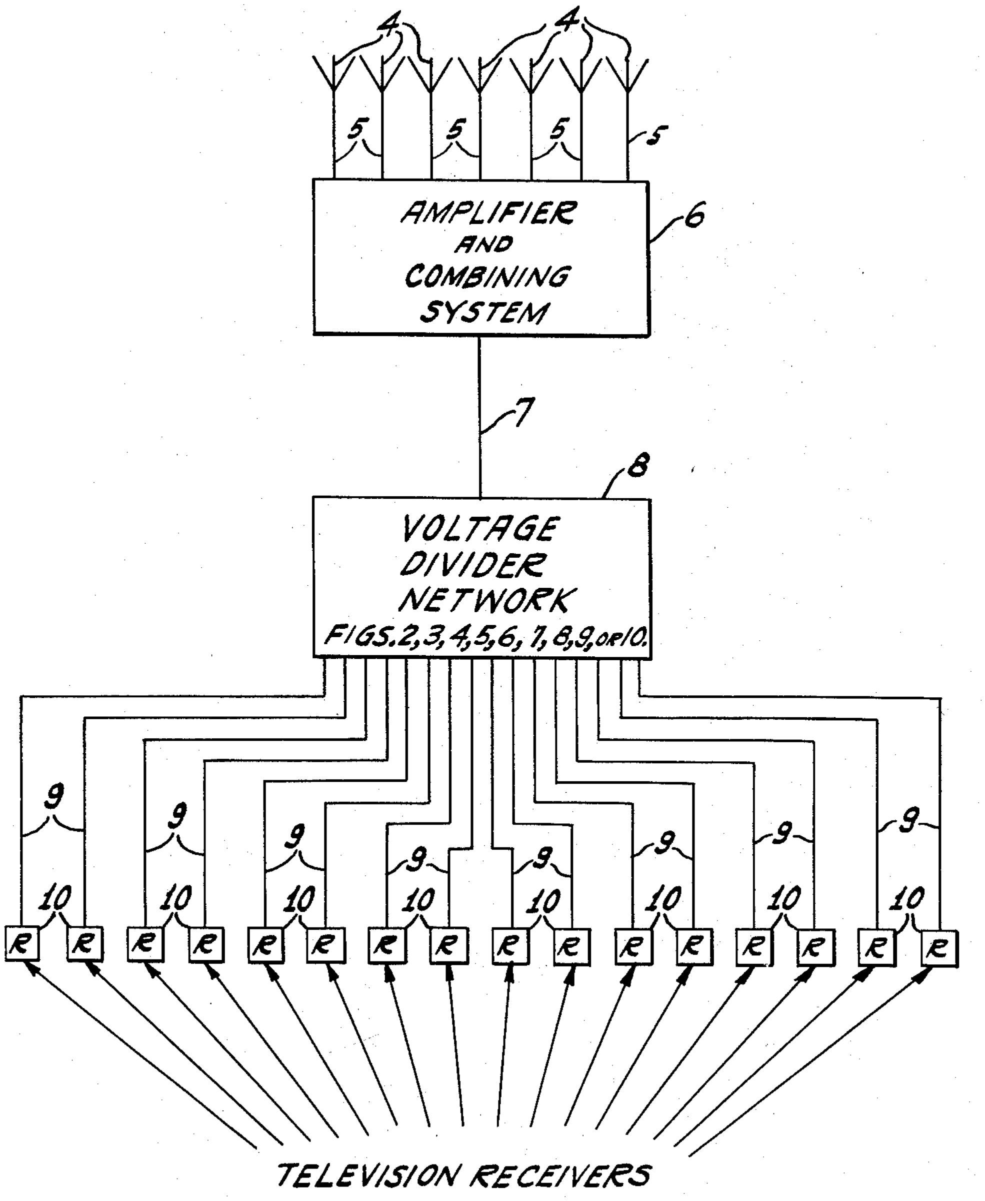
Fig. 1 shows by way of example only a television receiving system using a master antenna and a plurality of outlets to which different receivers may be connected, in which the present invention finds special usefulness.

Referring now to Fig. 1, a multiple distribution receiving system is shown schematically by way of example to illustrate one use of the voltage divider network of this invention for television reception. Such a system is useful in hotels, apartment houses, hospitals, and at locations where it is desired to feed a multiplicity of television receivers. Receiving antenna means 4 are provided to collect radio frequency signals. When the system is used in a building, the antenna may be located on the roof. Where, however, it is desired to feed television receivers located in a valley which is shielded from the transmitter by a mountain, the antenna can be located on top of the mountain. The antenna means 4 may be a broadband omnidirectional antenna array, but for better signal-to-noise ratio preferably consists of a plurality of differently directed directional antennas of the proper dimensions for reception of each channel desired, with each antenna oriented for the optimum signal from a particular transmitter. The output from the antenna means 4 is coupled to an amplifier and combining system 6 either by means of individual transmission lines 5 from each antenna, or by a single transmission line, not shown. The amplifier and combining system 6 may have an individual amplifier for each television channel to be received, like that for example of the television Antennaplex system SX–8B, manufactured by Radio Corporation of America. Other suitable amplifiers may be used, for example one having two separate channels, one channel for the frequencies from 54 to 88 megacycles and a second channel for the frequencies from 174 to 216 megacycles. A single amplifier for the entire frequency band to be received and distributed may of course be used. The output of such amplifiers are combined and fed to a common transmission line 7 which may be, for example, a 75 ohm coaxial cable or a balanced twin lead line. If balanced twin lead line is used, it should be shielded to eliminate pickup from undesired sources.

Figure 2:
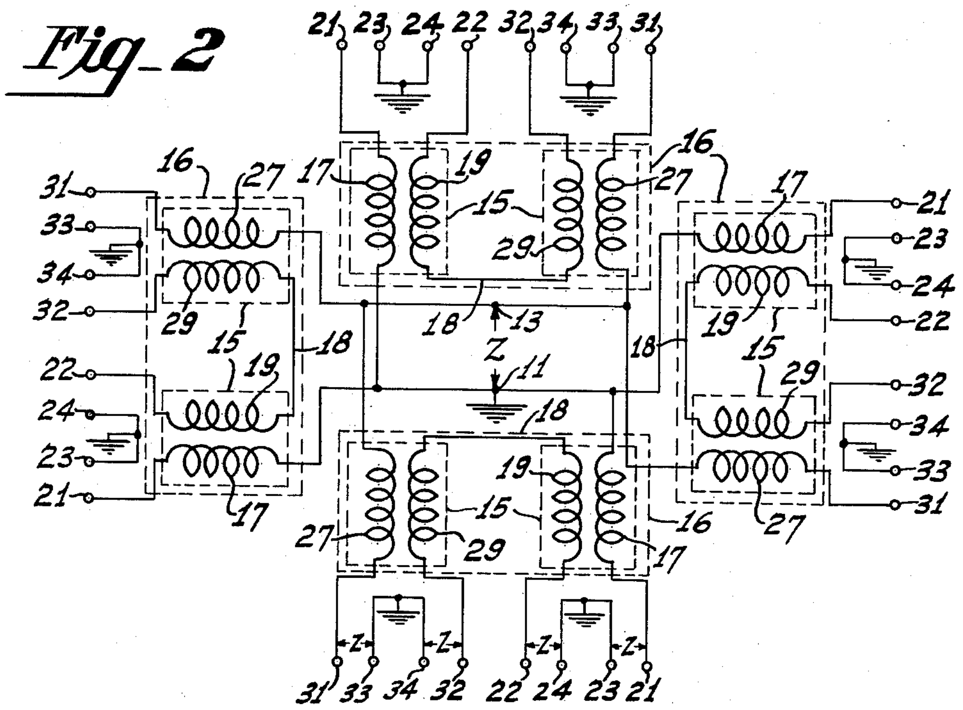
Fig. 2 shows an embodiment of a voltage divider network in accordance with this invention utilizing four pairs of similar bifilar transformers connected to give sixteen outputs from a single common input.
Figure 3:
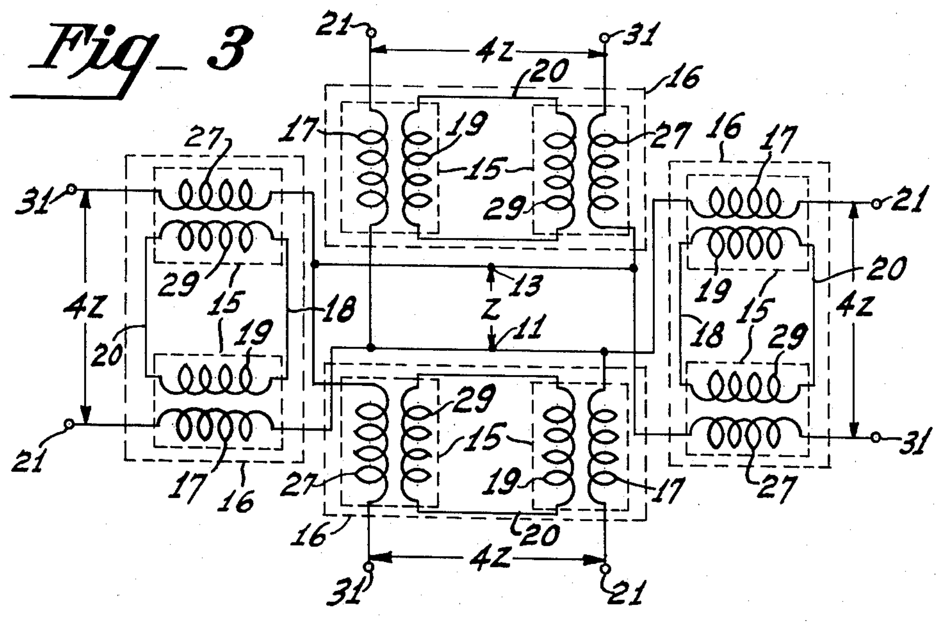
Fig. 3 illustrates an arrangement in accordance with the invention utilizing four pairs of bifilar transformers giving four outputs, each of which has an impedance of four times that of the common input.
Figure 4:
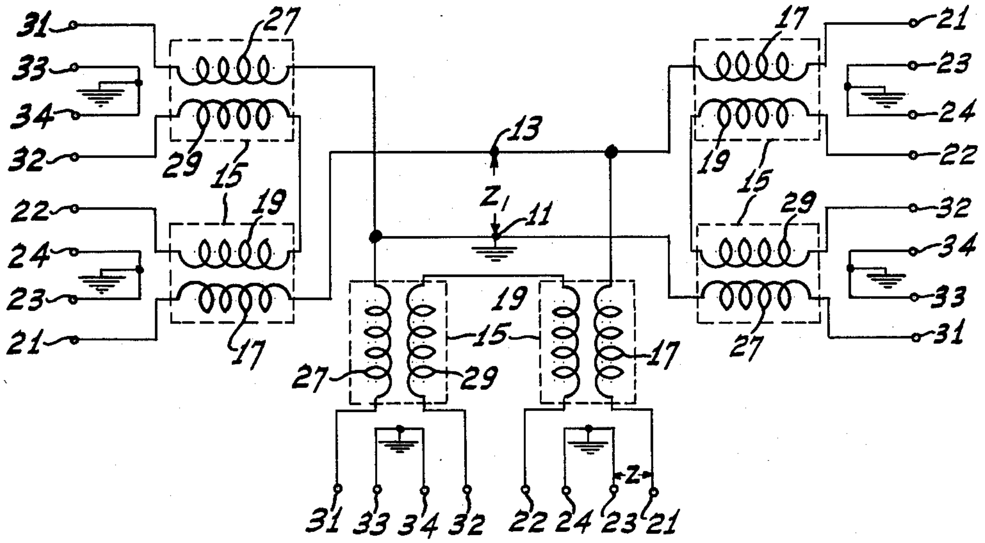
Fig. 4 illustrates a modification of the invention utilizing three pairs of bifilar transformers to give twelve outputs from a single input.
Figure 5:
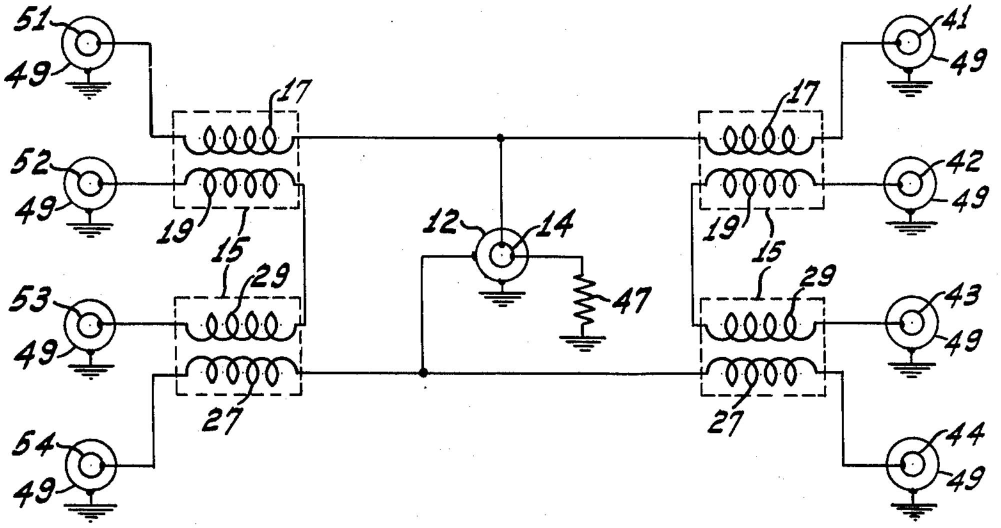
Fig. 5 illustrates an arrangement in accordance with the present invention utilizing two pairs of bifilar transformers giving eight outputs from a single input.
Figure 6:
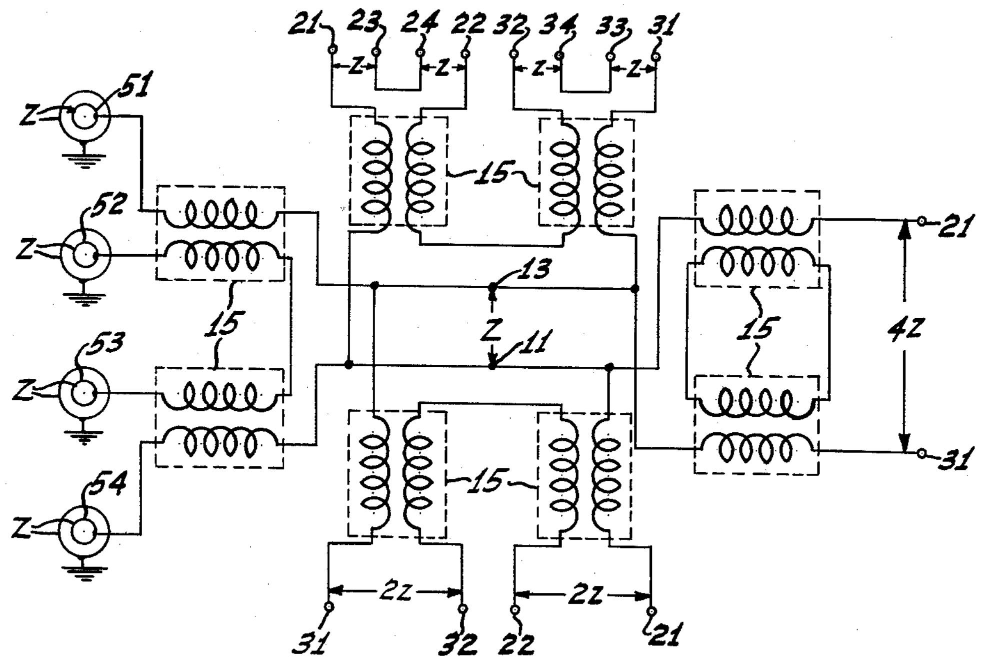
Fig. 6 illustrates various modifications of terminal connections which may be made in a voltage dividing device in accordance with the teachings of the present invention.

The transmission line 7 is terminated at the input of the voltage divider network 8 of this invention which may take any of the forms shown in Figs. 2 through 10. The amplified voltage, representing television signals from all the channels which are received by the antenna means 4, amplified and combined by the amplifier and combining system 6, is divided between a plurality of outlets and fed over individual transmission lines 9 to a plurality of television receivers 10. As will become apparent, the transmission lines 9, depending upon the output connections of the voltage divider network 8, may be coaxial cable or balanced twin lead line. Sixteen television receivers 10 are shown served by the voltage divider network 8 through individual transmission lines 9. This illustrates the output terminal connections of the network explained in connection with Fig. 2 below. If the output terminal connections of Fig. 3 are employed, four television receivers 10 would be served by the voltage divider network 8. Similarly, if the output connections of Fig. 4 are used, twelve such television receivers 10 would be served, and with the output connections of Fig. 5, eight television receivers would provide a proper termination for the voltage divider network. If the output connections of Fig. 6 are utilized, eleven receivers 10 could be connected to the voltage divider network 8.

If more than sixteen receivers are to be served by the system, an additional voltage divider network like that illustrated in Figs. 2, 3, 4, 5, 6, 7, or 9 could be connected arcoss any of the output transmission lines 9 of the voltage divider network 8 to provide as many as sixteen additional outlets in place of each television receiver 10. If each television receiver 10 is replaced by a voltage divider network like that of Fig. 2, as many as 256 individual receivers 10 can be served from a single amplifier and combining system 6 through only two stages of voltage division. Obviously, additional outlets can be served by coupling a plurality of voltage divider networks 8 to the output of the amplifier and combining system 6, preferably through a distribution transformer having a single input line 7 and four different outputs, each of which may supply energy to a voltage divider network 8.

In Fig. 2 there is illustrated an embodiment of the invention which can be used in box 8 of Fig. 1 and which gives sixteen outputs from a single common input using four pairs of bifilar transformers. The different pairs of transformers are shown in different boxes 16. A single pair of input terminals 11, 13 is adapted to have connected thereto a source of voltage, not shown, having an impedance Z. Such a source of voltage may be, for example, the terminals of a transmission line from an antenna, or the output from an amplifier, like that shown in Fig. 1 and designated by the reference character 6.

There are shown eight bifilar transformers 15, each of which has an impedance of 2Z between separate but coupled windings 17 and 19 or between similarly separate and coupled windings identified by the reference characters 27 and 29. The transformers 15 are all electrically similar but the separate windings of each pair are given different reference characters for the purposes of clarity of description, although corresponding windings of different pairs are given the same reference numerals.

Each pair of transformers in any one dashed-line rectangle 16 is connected in the following manner: One winding 19 of each transformer 15 is connected to one winding 29 of the other transformer in the same pair at one end by means of a connection 18. The other winding 17 of one transformer is connected to one of the input terminals 11 at the same end of the transformer, and the same end of the other winding 27 of the other transformer is connected to the other input terminal 13. This connection of the transformers 15 gives an impedance of 4Z on the input side. Four such pairs of transformers are so connected to present a total impedance of Z to the common incoming transmission line which, in turn, is connected to the input terminals 11, 13, correctly terminating the input line.

On the output side, the windings 17, 19 of each transformer are connected to terminals designated by the reference characters 21 and 22. Similarly, the windings 27, 29 are connected to terminals designated by the reference characters 31 and 32. The impedance thus appearing across the terminals 21, 22 of each transformer 15 is 2Z, and the same impedance appears across the terminals 31, 32 of the other transformer in the pair.

The voltage appearing on the output side, across for example terminals 21 and 22, is an essentially balanced voltage, that is to say, in push-pull relationship. This feature is utilized by providing two additional terminals 23 and 24 connected together to form an electrical midpoint for the output of each transformer so that two single-ended or unbalanced outputs are obtained by connecting similar loads across the output terminals 21, 23 and those on the other side of the same transformer 22, 24. The midpoint represented by terminals 23 and 24 of the outputs circuit may be grounded. The grounding connection is especially desirable when the voltage to be distributed is carried by coaxial cable. Such a coaxial cable termination, shown for example in Fig. 5, would have the sheath connected to the grounded terminal 23 or 24 and the central coaxial conductor connected to the terminal 21 or 22 which is connected to the transformer winding 17 or 19, respectively.

It is to be understood that for the voltage divider network to operate so that an equal voltage appears across each pair of output terminals, 21, 23 or 22, 24, all of the other pairs of output terminals fed from the common single pair of input terminals 11, 13 must be properly terminated.

In the embodiment of Fig. 2, with both output and input circuits properly terminated, a minimum of reflection loss due to mismatching occurs between the signal input circuit, connected across input terminals 11, 13, and the output load device, not shown, which is connected across any pair of output terminals, for example those designated by the reference numerals 21, 23 or 22, 24. Further, since only a single bifilar transformer arrangement appears between any pair of output terminals and the input terminals, 11, 13, the absorption loss, which is due to power dissipation in the intermediate circuit components between input and output, is also reduced to a minimum. Thus it is seen that the insertion loss of the system of the present invention has been reduced in two ways. The absorption loss has been reduced considerably over the tandem arrangement of prior art systems. The reflection loss has been minimized by eliminating interconnections of units in a tandem arrangement and utilizing a smaller number of transformers between which mismatch may occur.

In an embodiment of the invention which was successfully tried out in practice, each of the bifilar transformers 15 was designed to have a nominal impedance of 150 ohms for the very high frequency television bands including the range from 54 to 216 megacycles. Each transformer 15 had a plastic core such as Bakelite, three-eighths of an inch in diameter, and one and three-eighths inches long. The bifilar windings comprised thirty-one turns of solid conductor single strand copper wire .007" in diameter. The input circuit, which was connected across the terminals 11, 13 shown in Fig. 2, was a 75 ohm coaxial line with one side grounded. The individual terminations across the output terminals were also 75 ohms. The average loss from the common input to each output was 13 decibels of which 12 decibels of loss can be ascribed to the power division between the sixteen output circuits with only 1 decibel of insertion loss due to the divider network. This compares to a total loss of 24 decibels when resistance networks are used for voltage dividing one input into sixteen outputs.

Fig. 3 illustrates a second arrangement in accordance with the invention utilizing four pairs of bifilar transformers connected to give four outputs, in which each output has an impedance four times that of the input. It will be noted that the connections on the input side are identical with those of Fig. 2. The input terminals 11, 13 are adapted to be connected to a source of input voltage, not shown, having an impedance Z. The four pairs of bifilar transformers 15 shown in dashed-line rectangles 16 are connected on the input side in the manner shown in Fig. 2 so that each offers an impedance of 4Z to the input terminals, but the total impedance of the four pairs of transformers 15 in parallel matches the impedance Z across the input terminals. On the output side, one winding 19 of each transformer 15 is connected to one winding 29 of the other transformer in the pair on the output end by a connection 20. The other winding 17 on the output side is connected to one output terminal 21. Similarly the other winding 27 of the other transformer is connected on the output side to an output terminal 31.

Since each of the transformers 15 has a characteristic impedance of 2Z across the separate windings, the impedance across both pairs of windings and consequently across the terminals 21, 31 is 4Z. The voltages appearing across all four pairs of output terminals 21, 31 are equal. The output load devices, not shown, which may be connected across the pairs of terminals 21, 31 should have a characteristic impedance of 4Z to properly terminate the impedance of the voltage divider network at the output terminals 21, 31. The source of input voltage which may be connected across the input terminals 11, 13 may be either a balanced, that is to say push-pull source, or an unbalanced source having one side grounded. The same condition obtains for the load to be connected across any pair of output terminals 21, 31. In case an unbalanced load having one side grounded is connected across any pair of output terminals 21, 31, either terminal 21 or 31 may be connected to the grounded side of the load device, not shown.

In Fig. 4, three pairs of bifilar transformers are connected to give twelve output circuits, in accordance with the teachings of the present invention. It will be noted that the connections of all of the various components are identical with those of Fig. 2 with the single exception that where in Fig. 2 four pairs of bifilar transformers are shown connected in parallel across the input terminals 11, 13, in Fig. 4 only three pairs of transformers are used and connected to give twelve output terminations.

If it is desired to divide the voltage appearing across the input terminals 11, 13 into twelve equal outputs, if each of the output load devices which are connected across any pair of output terminals, for example, those designated by the reference numerals 21, 23 or 22, 24, have an impedance of Z, then the signal input circuit (not shown) which is connected across the input terminals 11, 13, should have an impedance of four-thirds Z, which in Fig. 4 is designated as $Z_1$. If, however, the input circuit connected across the input terminals 11, 13 has an impedance equal to that of the output load devices, or in other words, if from the nature of the equipment to be connected $Z=Z_1$, the voltage divider network of Fig. 4 will still give completely satisfactory results. Although the input is not terminated in its theoretically exact impedance, it has been found experimentally that the voltage delivered to the separate outputs is of the order of that which would be expected with essentially matched input terminations and further that the reflection due to the slight mismatch in termination of the input line is negligible.

In an embodiment successfully used in accordance with Fig. 4, individual transformers 15 like those described in connection with the embodiment of Fig. 2 above, having an impedance of 150 ohms between the separate windings were connected in the manner shown and a 75 ohm coaxial line termination from a signal source of 75 ohms impedance was connected across the input terminals 11, 13. The individual output terminals, such as for example those designated by the reference numerals 31, 33 or 32, 34, were all terminated in load devices of 75 ohms. An average loss from the input to each output in the neighborhood of 12.5 decibels was found. To obtain twelve outputs with a resistance dividing network, a loss of 22 decibels would result.

In Fig. 5 there is shown a modification of the present invention utilizing two pairs of bifilar transformers connected in such a way that eight output circuits are obtained from a single input. It will be noted that the transformer windings 17, 19 and 27, 29 are connected on the input side in the same manner as those in Fig. 2. The input circuit termination is shown in this figure as a coaxial cable having a sheath 12 which may be grounded, and a central conductor 14. On the output side of the bifilar transformer 15, the individual windings 17, 19, 29 and 27 are connected to the center conductors of coaxial cable terminations 41, 42, 43 and 44 respectively for one pair of transformers, and to similar terminals for the other pair of transformers, which terminals are designated by the reference characters 51, 52, 53 and 54. The sheath 49 of each coaxial cable is grounded for shielding purposes.

Since only two pairs of bifilar transformers 15 are connected across the input circuits 12, 14, the impedance presented to the input circuit will be 2Z, assuming that each bifilar transformer has an impedance of 2Z between the separate windings thereof. If the impedance of the signal source (not shown) which is connected to the input terminals 12, 14 is 2Z, and each of the output loads connected between the output terminals, for example 41 and ground or 42 and ground, is Z, then perfect matching and consequent perfect voltage division occurs with a minimum of loss.

If, however, it is desired to terminate a voltage source having an impedance of Z into the terminals 12, 14 of the voltage divider network shown in Fig. 5, a compromise arrangement must be made. This is represented by a resistance 47 connected across the input terminals 12, 14 to reduce the reflection loss which would result from the 2 to 1 impedance mismatch if no auxiliary resistance 47 were connected across the terminals 12, 14. To satisfy the conditions of perfect impedance match between an input source of an impedance of Z where the output terminations for each of the eight outputs have an impedance of Z, the value of the resistance 47 should be 2Z. If a value of 2Z is used for the resistance 47, half of the power is absorbed in the resistance 47. On the other hand, for maximum transfer of energy, the optimum value of the resistance 47 would be infinite. This condition of mismatch introduces considerable reflection loss. A compromise between these two extremes has been found experimentally to be a value of resistance slightly in excess of 4Z. This compromise reduces the reflection loss to within tolerable limits and at the same time does not absorb as much of the power as would be the case with the lower value of resistance.

In an actual embodiment of the circuit in Fig. 4 in which a signal input having an impedance of 75 ohms was connected across the input terminals 12, 14 and load devices having an impedance of 75 ohms were connected across each of the output circuits, a value of the resistance 47 of 390 ohms gave a highly satisfactory compromise between that which would be desired from a matching standpoint and that which would be desired for perfect voltage division. It was found experimentally in this embodiment that the voltage delivered to the separate outputs is of the order that would be expected with more nearly exact matching, and that the reflection due to the slight mismatch in termination of the input line was negligible.

In Fig. 6 there are illustrated some modifications of output connections which may be made to the voltage dividing network of the present invention. Four pairs of bifilar transformers 15 are connected on the input side in the same manner as those of Fig. 2. On the output side there are shown terminal connections for feeding load devices having an impedance of Z, 2Z or 4Z in accordance with the explanation of Figs. 2, 3 and 5. From the pair of bifilar transformers 15 at the left of the drawing, four coaxial terminations are made to coaxial outlets 51, 52, 53, 54 which feed load devices having an impedance of Z. At the top of the drawing a pair of bifilar transformers 15 is connected to feed four outputs to which load devices having an impedance of Z may be connected. It will be noted that the terminals 23 and 24 and 33 and 34 which form the midpoint of the balanced output voltage from each transformer 15 need not necessarily be grounded. The load impedances Z, however, which are connected across the pairs of terminals 21 and 23, 22 and 24, 31 and 33, and 32 and 34 must be very nearly exactly equal to give equal voltage division. The pair of transformers 15 appearing at the right of the drawing have their output terminals 21, 31 connected to the windings of the transformer in the manner explained in the description of Fig. 3 to give an output impedance of 4Z. The pair of bifilar transformers 15 at the bottom of the drawing have the output terminals 21, 22 and 31, 32 connected to the windings of the transformer so that load devices having an impedance of 2Z will properly terminate this arrangement. It should be noted at this point that if terminations in accordance with the explanation of this figure are made, all that was said in connection with Fig. 2 concerning perfect termination and minimum of loss still applies; however the voltage division will be unequal in the ratio of the terminating impedances. Considered in another way, the voltage occurring across the terminals terminated in an impedance of Z will be only one-half as great as that across those terminals terminated in an impedance of 2Z and one-quarter of that across those terminals terminated in 4Z.

Figure 7:
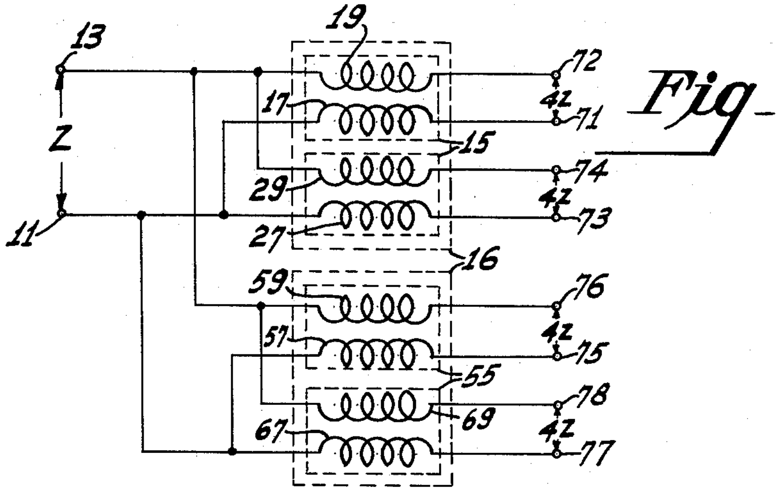
Fig. 7 illustrates an arrangement in accordance with the invention utilizing two pairs of bifilar transformers or transmission coils giving four outputs, each of which has an impedance of four times that of the common input.

In Fig. 7 there is illustrated an embodiment of the invention which can be used in box 8 of Fig. 1 and which gives four outputs from a single common input utilizing two pairs of transmission coils or bifilar transformers. The different pairs of transformers are shown in separate boxes 16. A single pair of input terminals 11, 13 is adapted to have connected thereto a source of voltage, not shown, having a characteristic impedance Z.

Each of the bifilar transformers or transmission coils 15 has an impedance of 4Z (instead of 2Z as was the case in Figs. 2 through 6) between the separate but coupled windings 17 and 19 or between the similarly separate but coupled windings identified by the reference characters 27 and 29. A second pair of bifilar transformers or transmission coils 55 is shown, and each transformer or coil has an impedance of 4Z between the separate but coupled windings 57 and 59 or between the separate but coupled windings 67 and 69. It will be noted that four of the windings 17, 27, 57, and 67 are directly connected to one of the input terminals 11 while the other windings 19, 29, 59, and 69 are directly connected to the other input terminal 13. Since each bifilar transformer or transmission coil 15 and 55 has a characteristic impedance of 4Z between the separate but coupled windings, the total impedance presented to the input terminals 11, 13 is Z.

The other ends of the windings 17, 19, 27, 29, 57, 59, 67 and 69 are connected to output terminals 71, 72, 73, 74, 75, 76, 77 and 78, respectively. The characteristic impedance presented across any pair of windings of the same coil, such as for example the terminals designated by the reference characters 71 and 72, will be 4Z.

The utility of the arrangement shown in Fig. 7 is illustrated by the problem of going from one 75 ohm input to four 300 ohm outputs, in which equal voltage division is required between the several outputs. With each pair of output terminals having connected thereto the proper impedance, in the illustrative example 300 ohms, equal voltage division will be obtained with a minimum of loss.

Figure 8:
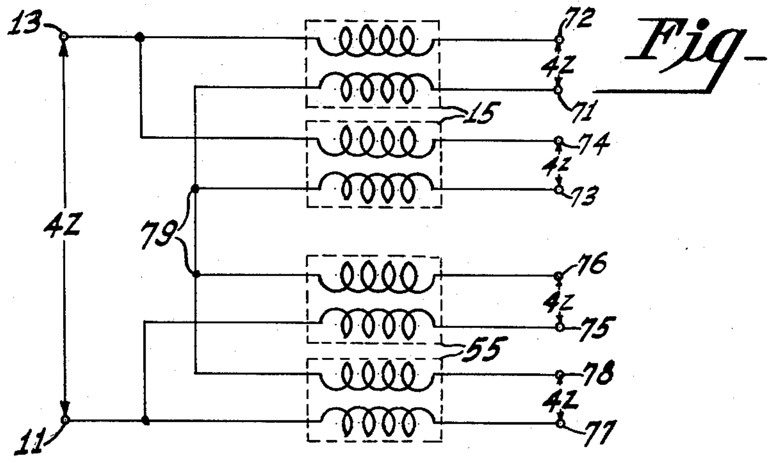
Fig. 8 illustrates an arrangement in accordance with the invention utilizing two pairs of bifilar transformers connected to give four outputs from a single common input.

In Fig. 8, two pairs of bifilar transformers or transmission coils 15 and 55 are connected in series across the input terminals 11, 13 to present an impedance of 4Z thereto, and provisions are made on the output side to give four outputs each having a characteristic impedance of 4Z. Since each bifilar transformer or coil 15 or 55 has an impedance of 4Z between the separate windings thereof, when these windings are connected in parallel an impedance of 2Z is presented across either of the input terminals 11, 13 and a center point between the coils designated by the reference character 79. The total impedance across the input terminals 11, 13 is thus 4Z.

If it is desired to serve sixteen outputs, each of which has an impedance of 4Z, from a single common input having an impedance of Z, four networks like that shown in Fig. 8 may be connected in parallel across the input terminals 11, 13. This connection obtains a proper impedance match and equal voltage division between all of the pairs of output terminals.

Figures 9, 10:
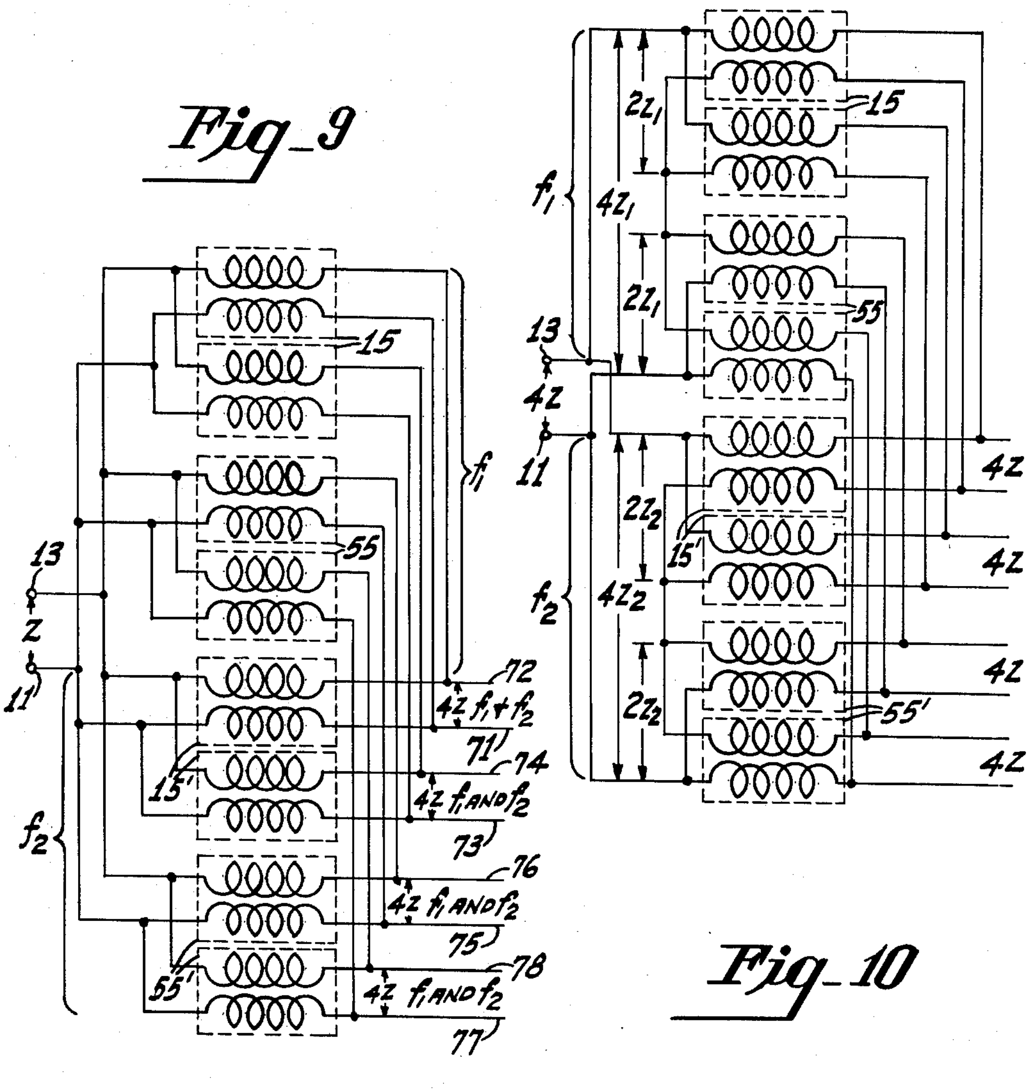
Fig. 9 illustrates an arrangement in accordance with the invention for dividing a signal into four outputs where the signal contains two separated bands of frequencies.
Fig. 10 illustrates another arrangement for dividing a signal containing separate bands of frequencies to give four outputs, each of which has an impedance the same as that of the source of signal voltage.

In Fig. 9 there is illustrated an adaptation of the embodiment shown in Fig. 7 which can be used in box 8 of Fig. 1 for dividing a signal into four outputs where the signal to be divided contains two separated bands of frequencies. As described in connection with Fig. 7, a single pair of input terminals, 11, 13, is adapted to have connected thereto a source of voltage, not shown, having a characteristic impedance Z. The source of voltage produces signal voltage in two separated bands of frequencies.

As described in connection with Fig. 7, each of the bifilar transformers or transmission coils 15, 55 has an impedance of 4Z between the separate but coupled windings for one of the bands of frequencies $f_1$ to be divided. Likewise two other pairs of bifilar transformers or transmission coils 15′, 55′ have an impedance of 4Z between the separate but coupled windings for a different band of frequencies $f_2$ The separated bands of frequencies $f_1$ and $f_2$ which are divided by the voltage divider network of this invention may be then recombined if desired for distribution to four individual output utilization devices which are connected across the output terminals 71 and 72, 73 and 74, 75 and 76, 77 and 78. Matching of the impedance of the coils to both input and output in this embodiment is obtained over one band of frequencies $f_1$ by the physical dimensions of the bifilar transformer or transmission coils 15, 55 and the properties of the core material employed. Matching over the other band of frequencies $f_2$ is similarly obtained by properly dimensioning the bifilar transformers or transmission coils 15', 55'.

The coils 15, 55 which are designed to have a characteristic impedance between windings of 4Z in the band of frequencies $f_1$ will have a higher impedance outside of this band. The impedance of the coils 15, 55 to signals in another band of frequencies $f_2$ depends upon the separation between frequencies $f_1$ and $f_2$. If the separation is greater than 2 to 1, that is, if $f_1$ is in the range of 50–220 megacycles, and $f_2$ has an upper limit less than 25 megacycles, the impedance of coils 15, 55 to signals in the band of frequencies $f_2$ will not significantly affect the impedance of the network to signals at frequency $f_2$, but such impedance is determined by the second pair of coils 15', 55' for that band of frequencies $f_2$. The converse is also true; that is, the impedance of the coils 15', 55' to signals at the frequency $f_1$ is high enough to have an insignificant effect at those frequencies on the impedance of the network.

With each of the four separate outputs properly terminated in its characteristic impedance 4Z, equal voltage division will be obtained for both bands of frequencies.

Fig. 10 shows an arrangement similar to that of Fig. 9 utilizing the transformer connections of Fig. 8 to give four outputs for two frequency bands $f_1$ and $f_2$ to present an impedance of 4Z to the source of voltage. Considering first the two pairs of bifilar transformers 15, 55 proportioned to pass a band of frequencies $f_1$, each of these transformers has an impedance of $4Z_1$ between the separate windings, and when these windings are connected in parallel, an impedance of $2Z_1$ will appear across each pair of transformers. A combination series parallel connection of both pairs of coils 15, 55 thus presents an impedance of $4Z_1$ to the input terminals 11, 13 at the frequency $f_1$. For a separated band of frequencies $f_2$, each of the transformers or transmission coils 15', 55' has an impedance of $4Z_2$. Utilizing a connection like that explained above with respect to the first pair of coils 15, 55 an impedance of $4Z_2$ is presented to the input terminals 11, 13 by the coils 15', 55' for the band of frequencies $f_2$.

If it is desired to serve sixteen outputs, each of which has an impedance of 4Z, from a single common input having an impedance of Z with two separated bands of frequencies $f_1$ and $f_2$, four networks like that shown in Fig. 10 may be connected in parallel across the input terminals 11, 13. This connection obtains a proper impedance match and equal voltage division between all of the pairs of output terminals for both bands of frequencies, assuming of course that each pair of output terminals is bridged by a load device having an impedance of 4Z.

I claim:

1. A voltage dividing network comprising a pair of input terminals, four pairs of bifilar transformers, each of said transformers comprising two separate windings, each pair of said bifilar transformers having an electrical connection from one of said input terminals to one end of one winding of one transformer, a second electrical connection from the other of said input terminals to one end of one winding of the other transformer, means connecting together the other bifilar windings at said one end, sixteen output terminals, and individual electrical connections respectively connecting the other ends of said bifilar windings to different ones of said output terminals.

2. A voltage dividing network comprising a pair of input terminals, three pairs of bifilar transformers, each of said transformers comprising two separate windings, each of said windings having first and second ends, each pair of said bifilar transformers having an electrical connection from one of said input terminals to the first end of one winding of one transformer, a second electrical connection from the other of said input terminals to the first end of one winding of the other transformer, means connecting together the first ends of the other bifilar windings, twelve output terminals, and individual electrical connections respectively connecting the second ends of said bifilar windings to different ones of said output terminals.

3. A voltage dividing network comprising a pair of input terminals, two pairs of bifilar transformers, each of said transformers comprising two separate windings, each of said windings having first and second ends, each pair of said bifilar transformers having an electrical connection from one of said input terminals to the first end of one winding of one transformer, a second electrical connection from the other of said input terminals to the first end of one winding of the other transformer, means connecting together the first ends of the other bifilar windings, eight output terminals, and individual electrical connections respectively connecting the second ends of said bifilar windings to different ones of said output terminals.

4. A voltage dividing network comprising a pair of input terminals, two pairs of bifilar transformers, each of said transformers comprising two separate windings, each winding having a first and a second end, an electrical connection from one of said input terminals to the first end of one winding of one transformer of each pair of said bifilar transformers, a second electrical connection from the other of said input terminals to the first end of one winding of the other transformer of the same pair, means connecting together the first ends of the other bifilar windings, a resistance connected across said input terminals, eight output terminals, and individual electrical connections respectively connecting the second ends of said bifilar windings to different ones of said output terminals.

5. A voltage dividing network comprising a pair of input terminals, a plurality of pairs of bifilar transformers, each of said transformers comprising two separate windings, said windings having first and second ends, means to connect at least the first end of one winding of one transformer in each pair to the first end of a winding of the other transformer in said pair, electrical connections from said input terminals to respective first ends of the two other windings in each pair, whereby said plurality of pairs of transformers are electrically connected in parallel across said input terminals, a plurality of output terminals greater than two, and further electrical connection means individually connecting the second ends of all of said windings to respective separate output terminals.

6. A voltage dividing network comprising a pair of input terminals, a plurality of pairs of bifilar transmission coils, each of said transmission coils comprising two separate windings, said windings having first and second ends, means to connect at least the first end of one winding of one transmission coil in each pair to the first end of a winding of the other transmission coil in said pair, said input terminals being connected to respective first ends of the two other windings of said transformers in each pair, a plurality of output terminals greater than two, and further electrical connection means individually connecting the second ends of all of said windings to respective separate output terminals.

7. A voltage dividing network comprising a pair of input terminals, a plurality of pairs of bifilar transformers, each of said transformers comprising two separate windings, said windings having first and second ends, each pair of said bifilar transformers having an electrical connection between the first end of a winding of one transformer and the first end of a winding of the other transformer of said pair, means coupling said input terminals to respective first ends of the other two windings of said pair, a plurality of output terminals greater than two, and further electrical connection means individually connecting the second ends of all of said windings to respective separate output terminals.

8. A voltage dividing network comprising a pair of input terminals, a plurality of pairs of bifilar transformers, each of said transformers comprising two separate windings, said windings having first and second ends, each pair of said bifilar transformers having an electrical connection from one of said input terminals to the first end of one winding of one transformer, a second electrical connection from the other of said input terminals to the first end of one winding of the other transformer of said pair, means connecting together the first ends of the other two windings of said pair of transformers, a plurality of output terminals greater than two, and individual electrical connections respectively connecting the second ends of all of said windings to different ones of said output terminals.

References Cited in the file of this patent

UNITED STATES PATENTS

| | | |
|---|---|---|
| 2,030,181 | Potter | Feb. 11, 1936 |
| 2,085,434 | Loftis et al. | June 29, 1937 |
| 2,145,548 | Landon | Jan. 31, 1939 |
| 2,151,081 | Carlson et al. | Mar. 21, 1939 |
| 2,229,043 | Butler | Jan. 21, 1941 |
| 2,229,044 | Butler | Jan. 21, 1941 |
| 2,319,106 | Blackburn | May 11, 1943 |
| 2,470,307 | Guanella | May 17, 1949 |
| 2,523,173 | Winters | Sept. 19, 1950 |
| 2,539,651 | Woodward | Jan. 30, 1951 |
| 2,611,807 | Lazzery | Sept. 23, 1952 |